(12) United States Patent
Martin

(10) Patent No.: US 6,778,719 B2
(45) Date of Patent: Aug. 17, 2004

(54) OPTICAL DEVICE FOR WAVELENGTH INTERLEAVING OR DISSOCIATION AND OPTICAL SWITCH

(75) Inventor: Philippe Martin, Pontchartrain (FR)

(73) Assignee: Nettest Photonics S.A.S., Sous Bois (FR)

(*) Notice: Subject to any disclaimer, the term of this patent is extended or adjusted under 35 U.S.C. 154(b) by 24 days.

(21) Appl. No.: 10/100,176

(22) Filed: Mar. 19, 2002

(65) Prior Publication Data

US 2003/0021006 A1 Jan. 30, 2003

(30) Foreign Application Priority Data

Mar. 19, 2001 (FR) .................................. 01 03708

(51) Int. Cl.[7] ........................... G02B 6/26; G02B 6/27; H04J 14/02
(52) U.S. Cl. ........................... 385/15; 385/11; 385/24; 385/39; 398/82
(58) Field of Search ........................... 385/11, 15, 16, 385/24, 27, 31, 39; 398/43, 45, 49, 60, 89, 82–86

(56) References Cited

U.S. PATENT DOCUMENTS

| | | | |
|---|---|---|---|
| 5,357,359 A | | 10/1994 | Uchiyama et al. |
| 6,023,360 A | * | 2/2000 | Morioka et al. ............ 359/123 |
| 6,275,322 B1 | * | 8/2001 | Tai ............................. 359/279 |
| 6,493,488 B1 | * | 12/2002 | Islam et al. .................. 385/47 |
| 6,560,015 B1 | * | 5/2003 | Cao ........................... 359/487 |
| 6,570,711 B2 | * | 5/2003 | Ducellier .................... 359/629 |
| 2002/0126935 A1 | * | 9/2002 | Krol et al. ..................... 385/11 |

FOREIGN PATENT DOCUMENTS

| | | |
|---|---|---|
| EP | 08005977 | 6/1994 |
| EP | 1 083 457 A1 | 7/1999 |

OTHER PUBLICATIONS

French Search Report No.: 0103708000 DU Mar. 19, 2001 V/Ref.: 63144 M Dec. 11, 2001.

* cited by examiner

Primary Examiner—John D. Lee
(74) Attorney, Agent, or Firm—Arent Fox

(57) ABSTRACT

An optical device for wavelength interleaving or dissociation includes a device for coupling a luminous flux generated by a source in an input fiber, a circulator linked to the input fiber and to an output fiber forming a first output gate of the optical device, and a polarisation beam splitter receiving the luminous flux coming out of the circulator and separating it into two components. A device is provided for transferring the luminous flux from one output to the other, a birefringent medium is interposed on the optical path and a fiber forms a second output of the optical device.

13 Claims, 4 Drawing Sheets

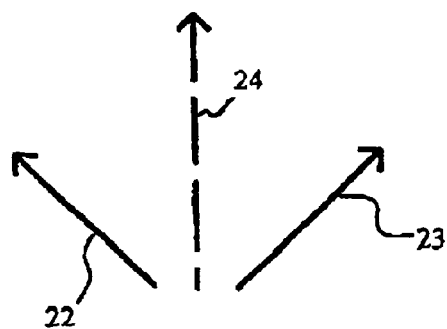
FIG. 5A
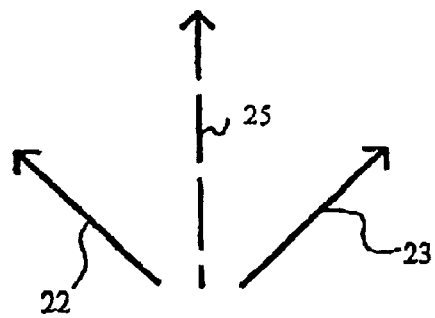
$\Delta\phi_{12} = 2K\pi$
FIG. 5B
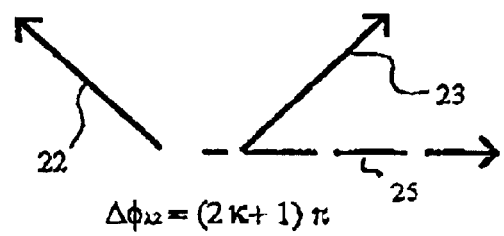
$\Delta\phi_{12} = (2K+1)\pi$
FIG. 5C
FIGURE 5

OPTICAL DEVICE FOR WAVELENGTH INTERLEAVING OR DISSOCIATION AND OPTICAL SWITCH

The development of optical fiber telecommunications has put in evidence the interest of wavelength multiplexing of numerous signals that are also frequency-shifted.

It is in this framework that so-called interleaver devices have been used and wherein two combs of multiplexed wavelengths such as represented respectively on FIGS. 1 and 2, are addressed on the inputs E1 and E2 of a two-wave interferometer.

The response of the interferometer for each of the inputs E1 and E2 being respectively R1 and R2, suitable adjustment of the interferometer enables multiplexing of both combs of wavelength respectively P1 ($\lambda_1, \lambda_3, \ldots, \lambda_{2p+1}$) and P2 ($\lambda_2, \lambda_4, \ldots, \lambda_{2p}$) without any significant energy losses.

The interest of such devices which have been described above is therefore easily understood.

More precisely, in a conventional fashion, such a two-wave, optical fiber interferometer has been realised while using two couplers, the first input coupler is C1, separating both waves which, after following optical paths, are recombined by the coupler C2, for instance, an interferometer of Mach-Zehnder such as represented on FIG. 4.

Adjusting the (step difference) travel length between both optical paths enables to interleave both combs of wavelengths respectively P1 ($\lambda_1, \lambda_3, \ldots, \lambda_{2p+1}$) and P2 ($\lambda_2, \lambda_4, \ldots, \lambda_{2p}$) such as represented on FIG. 3 in order to provide a multiplexed flux of interleaved wavelengths ($\lambda_1, \lambda_2, \lambda_3, \ldots, \lambda_{2p}, \lambda_{2p+1}$).

Thus, the operation of this device as a multiplexer has been described, interleaving combs of wavelengths. Obviously, such a device is reversible and may, in reverse direction, as a demultiplexer, separate combs of interleaved wavelengths.

However, restitution of very high quality signals calls for increased control of the multiplexing/demultiplexing stages.

The purpose of this invention is therefore to suggest an optical device for interleaving or dissociating a set of wavelength-multiplexed signals, simple in its design and in its operating mode, and which does not cause any losses.

To that end, the invention concerns an optical device for wavelength dissociation receiving a multiplexed flux of interleaved wavelengths ($\lambda_1, \lambda_2, \lambda_3, \ldots, \lambda_{2p}, \lambda_{2p+1}$) and generating a first and a second dissociated multiplexed fluxes, respectively ($\lambda_1, \lambda_3, \ldots, \lambda_{2p+1}$) and ($\lambda_2, \lambda_4, \ldots, \lambda_{2p}$), the frequency interval between two interleaved wavelengths $\lambda_{2p}, \lambda_{2p+1}$ being $\lambda f_1$.

According to the invention, this optical device comprises schematically:
  a fiber forming an input gate of the optical device,
  a circulator linked to said fiber and comprising a first and a second output fibers of said circulator,
  the second output fiber forming a first output gate of the optical device for the first dissociated multiplexed flux ($\lambda_1, \lambda_3, \ldots, \lambda_{2p+1}$),
  the first output fiber of said circulator being linked to an optical assembly by a collimation lens, said optical assembly defining a closed optical path consisting of:
    a polarisation beam splitter having polarisation axes receiving the flux going through the collimation lens and separating it into two contrapropagating components ($r_1$) and ($r_2$) on the optical path,
    means for transferring the luminous flux along the closed optical path,
    a birefringent medium having birefringent axes interposed on the optical path, said birefringent medium modifying the polarisation state of the flux going through it as a function of the wavelength, fluxes with wavelengths ($\lambda_2, \lambda_4, \ldots, \lambda_{2p}$) of the components ($r_1$) and ($r_2$) not being modified, the polarisation of the fluxes with wavelengths ($\lambda_1, \lambda_3, \ldots, \lambda_{2p+1}$) being interchanged between said components so that the polarisation beam splitter orients distinctly said first and second output-multiplexed fluxes,
  and in that the optical device comprises a fiber forming a second output gate of the optical device, and whereof the end is located at the focus of a collimation lens which receives said second dissociated multiplexed flux ($\lambda_2, \lambda_4, \ldots, \lambda_{2p}$) of the polarisation beam splitter.

The invention also concerns an optical device for wavelength interleaving receiving a first and a second multiplexed fluxes, respectively ($\lambda_1, \lambda_3, \ldots, \lambda_{2p+1}$) and ($\lambda_2, \lambda_4, \ldots, \lambda_{2p}$), and generating a multiplexed flux of interleaved wavelengths ($\lambda_1, \lambda_2, \lambda_3, \ldots, \lambda_{2p}, \lambda_{2p+1}$), the frequency spacing interval between two interleaved wavelengths $\lambda_{2p}, \lambda_{2p+1}$ being $\lambda f_1$.

According to the invention, this optical device comprises schematically:
  a fiber forming an output gate of the optical device for the multiplexed flux of interleaved wavelengths ($\lambda_1, \lambda_2, \lambda_3, \ldots, \lambda_{2p}, \lambda_{2p+1}$).
  a circulator linked to said fiber and comprising a first and a second output fibers of said circulator,
  the second output fiber forming a first input gate of the optical device for a first multiplexed flux ($\lambda_1, \lambda_3, \ldots, \lambda_{2p+1}$),
  the first output fiber of said circulator being linked to an optical assembly by a collimation lens, said optical assembly defining a closed optical path consisting of:
    a polarisation beam splitter having polarisation axes receiving the flux going through the collimation lens and separating it into two contrapropagating components ($r_1$) and ($r_2$) on the optical path,
    means for transferring the luminous flux along the closed optical path,
    a birefringent medium having birefringent axes interposed on the optical path, said birefringent medium modifying the polarisation state of the flux going through it as a function of the wavelength, the polarisation of both multiplexed fluxes ($\lambda_1, \lambda_3, \ldots, \lambda_{2p+1}$) and ($\lambda_2, \lambda_4, \ldots, \lambda_{2p}$) being interchanged between said components so that the polarisation beam splitter orients said multiplexed fluxes towards the output gate of the device,
  and in that the optical device comprises a fiber forming a second input gate of the optical device for the second multiplexed flux ($\lambda_2, \lambda_4, \ldots, \lambda_{2p}$), and whereof the end is located at the focus of a collimation lens which sends said second flux on the polarisation beam splitter.

In different particular embodiments having each its particular advantages and lending themselves to numerous technically possible combinations:
  said birefringent axes of the birefringent medium are oriented at 45° with respect the axes of the polarisation beam splitter,
  the birefringent medium is a birefringent crystal,
  the birefringent medium is a birefringent optical fiber,
  the polarisation beam splitter is a polarisation beam separator cube,
  transferring means are flat mirrors, placed at 90°, the assembly comprising the mirrors and the separator forming a closed loop.

Advantageously, the assembly of these components can be realised using fibers or still integrated optical components.

The invention also concerns an optical switch.

According to the invention, this switch contains a device for wavelength interleaving or dissociation such as defined above and according to the invention, it also contains a liquid crystal and control means receiving an electrical signal.

The invention will be described more in detail with reference to the appended drawings wherein:

FIGS. 5A–5C are schematic representations of the action of the birefringent medium on the polarisation state of the wave going through it, in relation to the wavelength.

Figure 1:
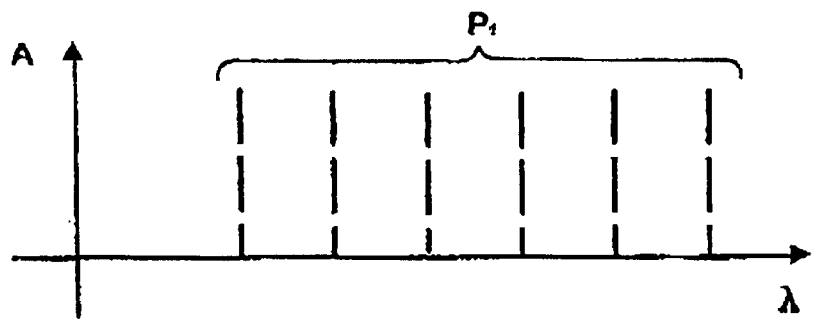
FIG. 1 is a representation of a first comb of wavelengths P1.
Figure 2:
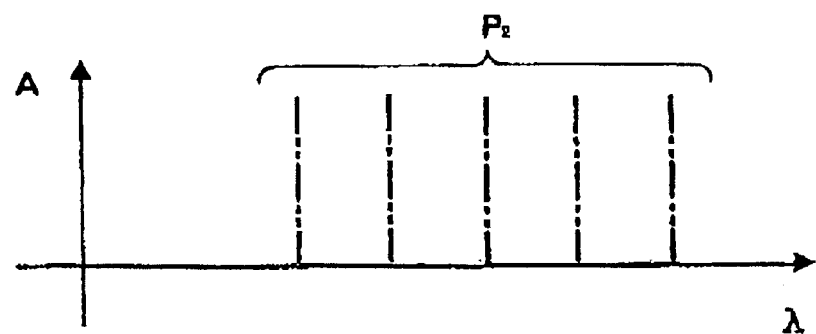
FIG. 2 is the representation of a second comb of wavelengths P2.
Figure 3:
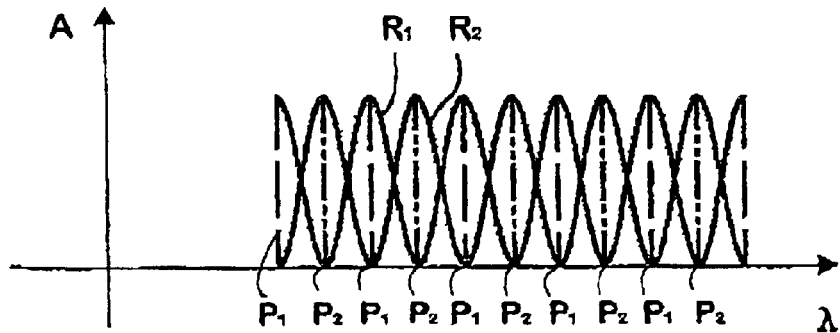
FIG. 3 is the representation of these combs interleaved in wavelengths.
Figure 4:
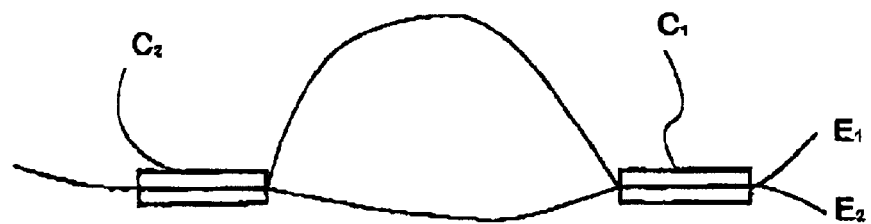
FIG. 4 is a representation of an interferometer of Mach-Zehnder made of optical fibers.
Figure 6:
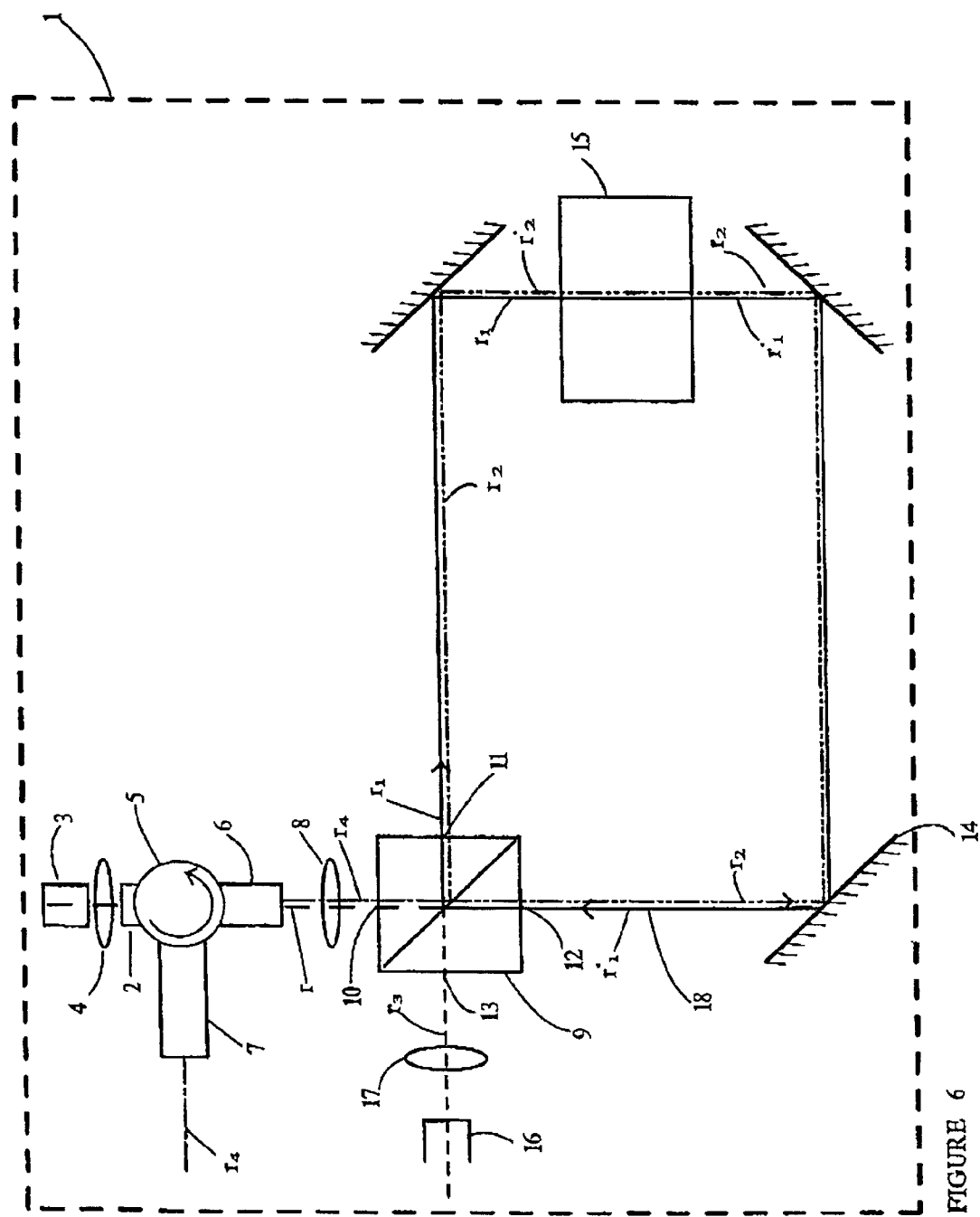
FIG. 6 is a schematic representation of a dissociation device, according to the invention.

FIG. 6 is a schematic representation of a dissociation device, according to the invention. The optical device 1 contains an input fiber 2 carrying a multiplexed flux of interleaved wavelengths ($\lambda_1$, $\lambda_2$, $\lambda_3$, ..., $\lambda_{2p}$, $\lambda_{2p+1}$) associating two combs of wavelengths P1 ($\lambda_1$, $\lambda_3$, ..., $\lambda_{2p+1}$) and P2 ($\lambda_2$, $\lambda_4$, ..., $\lambda_{2p}$) and generated by a source 3. Said input fiber 2 then forms an input gate of the optical device 1. By "comb of wavelengths", in analogy to the combs of Dirac, is meant a set of wavelengths often multiplexed and regularly spaced in wavelength. Coupling means 4, for instance a lens, enables to couple the fiber 2 to a circulator 5 linked to this input fiber 2 and to a first 6 and a second 7 output fibers. The second output fiber 7 forms a first output gate of the optical device 1. The multiplexed flux of interleaved wavelengths ($\lambda_1$, $\lambda_2$, $\lambda_3$, ..., $\lambda_{2p}$, $\lambda_{2p+1}$) coming out of the fiber 6 is coupled to the remainder of the optical device by a collimation lens 8. The end of the optical fiber 6 is situated at the focus of this lens 8.

A polarisation beam splitter 9, for instance a separator cube, having polarisation axes and consisting of four gates whereof an input gate 10 and three output gates 11, 12 and 13, receives the flux going through the collimation lens 8 and separates it into two components $r_1$ and $r_2$. Means for transferring 14 the luminous flux enable to carry it from output to the other. The transfer means 14 are for instance flat mirrors positioned at 90°. A birefringent medium 15 having birefringent axes, for instance, a birefringent crystal is interposed on the optical path. In a preferred embodiment, the axes of the birefringent medium 22, 23 (FIG. 5) are placed at 45° with respect to the axes of the polarisation beam splitter. A fiber 16 forming a second output gate of the optical device 1 receives the emerging beam $r_3$ coming out the beam splitter 9 by means of a collimation lens 17. The second emerging beam $r_4$ being superimposed, but of reverse direction to the input beam r, the circulator 5 enables to separate these fluxes without energy losses, the input fiber 2 supplying the beam r and the output fiber 7 receiving the output flux $r_4$. The examples of elements considered in the description are subject to modifications with the evolution of technologies. The use of a birefringent crystal as a birefringent medium 15 can for instance be replaced with the implementation of a birefringent optical fiber. Similarly, the annular interferometer assembly can be realised with birefringent optical fibers.

Thus, a beam entering through an input fiber 10 and consisting of two combs of interleaved wavelengths P1 ($\lambda_1$, $\lambda_3$, ..., $\lambda_{2p+1}$) and P2 ($\lambda_2$, $\lambda_4$, ..., $\lambda_{2p}$), is separated at the output of a beam splitter 9, into two components linearly polarised and of orthogonal directions, $r_1$ and $r_2$. These components travel in trigonometric reverse direction in a loop 18 formed by a set of elements composed of transfer means 14, a birefringent medium 15 and the separator 9. Considering that one of these components, for instance $r_1$, goes through the birefringent medium 15 (FIG. 5A), the combs of wavelength P1 ($\lambda_1$, $\lambda_3$, ..., $\lambda_{2p+1}$) and P2 ($\lambda_2$, $\lambda_4$, ..., $\lambda_{2p}$) undergo a different polarisation transformation. Thus whereas the comb of wavelength P1 (respectively P2) goes through the birefringent medium 15 without changing its polarisation direction (FIG. 5B), the comb P2 (respectively P1) becomes polarised orthogonally (FIG. 5C) to the output polarisation direction 25 of the comb of wavelength P1 (respectively P2). At the output of the birefringent medium 15, the luminous flux is carried by a beam $r'_1$. The other component $r_2$, circulating in reverse trigonometric direction, is subject to the same mechanism as it passes through the birefringent medium 15. The luminous flux is then carried to the output of the medium 15 by a beam $r'_2$. After going through the beam separator 9, an emerging beam $r_3$ carries the comb P1 (respectively P2) whereas a beam $r_4$ carries the comb P2 (respectively P1).

It can be understood that the device of the invention is reversible and may form either a device for dissociating a set of wavelength multiplexed signals, or a device for interleaving two sub-sets of wavelength multiplexed signals, according to the direction of its use.

$\Delta n$ being the index variation between both birefringent axes, an optical frequency wave f sees a cumulated phase-shift between both birefringent axes of $\Delta\phi = 2\pi \, \Delta n \, 1 \, f/c$, 1 being the thickness of the birefringent medium 15.

If $\Delta\phi = 2 \, k\pi$, the wave does not undergo any polarisation modifications (FIG. 5B). In such a case, regardless of the polarisation at input 24, the luminous wave goes through the gate 16 of the device of FIG. 7.

Figure 7:
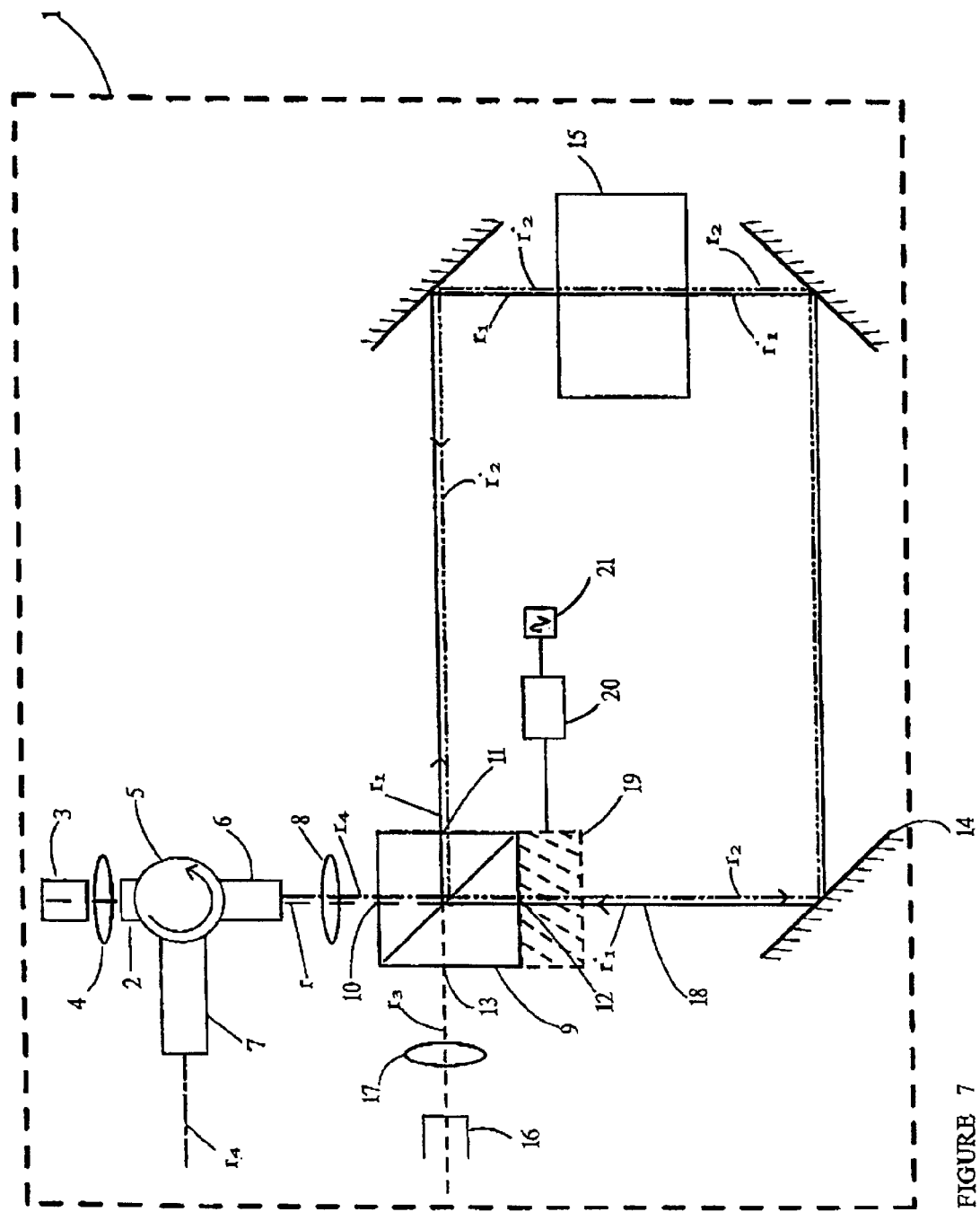
FIG. 7 is a schematic representation of a dissociation device with an output beam switch.

If $\Delta\phi = (2 \, k+1)\pi$, the wave is subject to a polarisation symmetry and goes through the gate 7 of the device of FIG. 7.

The phase-shift $\Delta\phi$ depending on the optical frequency, it can thus be obtained a wavelength selector with a pitch $\Delta f$ such that $2\pi \, \Delta n \, 1 \, \Delta f/c = 2\pi$, i.e. $\Delta f = c/2 \, \Delta n \, 1$.

The interleaver or dissociation optical device can advantageously be applied to the realisation of an interleaver or dissociation device with an output switch. On FIG. 7 is represented schematically such an optical switch for a dissociation device. The optical device is identical to that described above (FIG. 6), but a tuneable birefringent system 19 is inserted by aligning the birefringent axes with those of the birefringent medium 15. Control means 20 of this tuneable birefringent system 19 receive an electrical signal 21.

A beam entering through an input fiber 10 and consisting of a multiplexed flux of interleaved wavelengths ($\lambda_1$, $\lambda_2$, $\lambda_3$, ..., $\lambda_{2p}$, $\lambda_{2p+1}$) associating two combs of wavelengths P1 ($\lambda_1$, $\lambda_3$, ..., $\lambda_{2p+1}$) and P2 ($\lambda_2$, $\lambda_4$, ..., $\lambda_{2p}$), is separated at the output of a beam separator 9, into two components linearly polarised and of orthogonal directions, $r_1$ and $r_2$. These components travel in trigonometric reverse direction in a loop 18 formed by a set of elements composed of transfer means 14 and the separator 9. Considering that one of these components, for instance $r_1$, goes through the birefringent medium 15 (FIG. 5A), the combs of wavelengths P1 ($\lambda_1$, $\lambda_3$, ..., $\lambda_{2p+1}$) and P2 ($\lambda_2$, $\lambda_4$, ..., $\lambda_{2p}$) undergo a different polarisation transformation. Thus whereas the comb of wavelength P1 (respectively P2) goes through the birefringent medium 15 without changing its polarisation direction (FIG. 5B), the comb P2 (respectively P1) becomes polarised orthogonally (FIG. 5C) to the output polarisation direction 25 of the comb of wavelength P1

(respectively P2). At the output of the birefringent medium 15, the luminous flux is carried by a beam $r'_1$. This beam then goes through the tuneable birefringent system 19. Application by control means 20 of a suitable voltage to the tuneable birefringent system 19 enables to modify the orientation of the polarisation of the beam going through it. The polarisation direction of the combs of wavelengths P1 and P2 can then be modified simultaneously, but their respective direction remains nevertheless orthogonal. The other component $r_2$, circulating in trigonometric reverse direction, can be modified a first time as it goes through the tuneable birefringent system 19. This beam is then modified by the birefringent medium 15 before reaching again the beam separator 9. This optical device can therefore advantageously be used for assigning the comb P2 to the emerging beam $r_3$ and the comb P1 to the emerging beam $r_4$ or conversely. It has thus been realised an output optical switch.

What is claimed is:

1. A wavelength dissociation optical device (1) receiving a multiplexed flux of interleaved wavelengths ($\lambda_1$, $\lambda_2$, $\lambda_3$, ..., $\lambda_{2p}$, $\lambda_{2p+1}$) and generating a first and a second dissociated multiplexed fluxes, respectively ($\lambda_1$, $\lambda_3$, ..., $\lambda_{2p+1}$) and ($\lambda_2$, $\lambda_4$, ..., $\lambda_{2p}$), the frequency interval between two interleaved wavelengths $\lambda_{2p}$, $\lambda_{2p+1}$ being $\Delta f_t$, wherein it comprises:

a fiber (2) forming an input gate of the optical device (1), a circulator (5) linked to said fiber (2) and comprising a first (6) and a second (7) output fibers of said circulator (5), the second output fiber (7) forming a first output gate of the optical device (1) for the first dissociated multiplexed flux ($\lambda_1$, $\lambda_3$, ..., $\lambda_{2p+1}$), the first output fiber (6) of said circulator (5) being linked to an optical assembly by a collimation lens (8), said optical assembly defining a closed optical path consisting of:

a polarisation beam splitter (9) having polarisation axes receiving the flux going through the collimation lens (8) and separating it into two contrapropagating components ($r_1$) and ($r_2$) on the optical path, means for transferring (14) the luminous flux along the closed optical path, a birefringent medium (15) having birefringent axes interposed on the optical path, said birefringent medium modifying the polarisation state of the flux going through it as a function of the wavelength, the fluxes with wavelengths ($\lambda_2$, $\lambda_4$, ..., $\lambda_{2p}$) of the components ($r_1$) and ($r_2$) not being modified, the polarisation of the fluxes with wavelengths ($\lambda_1$, $\lambda_3$, ..., $\lambda_{2p+1}$) being interchanged between said components so that the polarisation beam splitter (9) orients distinctly said first and second output-multiplexed fluxes, and in that the optical device (1) comprises a fiber (16) forming a second output gate of the optical device (1), and whereof the end is located at the focus of a collimation lens (17) receiving said second dissociated multiplexed flux ($\lambda_2$, $\lambda_4$, ..., $\lambda_{2p}$) of the polarisation beam splitter (9).

2. An optical device for wavelength interleaving (1) receiving a first and a second multiplexed fluxes, respectively ($\lambda_2$, $\lambda_3$, ..., $\lambda^{2p+1}$) and ($\lambda^2$, $\lambda^4$, and generating a multiplexed flux of interleaved wavelengths ($\lambda_1$, $\lambda_2$, $\lambda_3$, ..., $\lambda_{2p}$, $\lambda_{2p+1}$), the frequency interval between two interleaved wavelengths $\lambda_{2p}$, $\lambda_{2p+1}$ being $\Delta f_1$, wherein it comprises:

a fiber (2) forming an output gate of the optical device (1) for the multiplexed flux of interleaved wavelengths ($\lambda_1$, $\lambda_2$, $\lambda_3$, ..., $\lambda_{2p}$, $\lambda_{2p+1}$)

a circulator (5) linked to said fiber (2) and comprising a first (6) and a second (7) output fibers of said circulator (5), the second output fiber (7) forming a first input gate of the optical device (1) for a first multiplexed flux ($\lambda_1$, $\lambda_3$, ..., $\lambda_{2p+1}$)

the first output fiber (6) of said circulator (5) being linked to an optical assembly by a collimation lens (8), said optical assembly defining a closed optical path consisting of:

a polarisation beam splitter (9) having polarisation axes receiving the flux going through the collimation lens (8) and separating it into two contrapropagating components ($r_1$) and ($r_2$) on the optical path, means for transferring (14) the luminous flux along the closed optical path, a birefringent medium (15) having birefringent axes interposed on the optical path, said birefringent medium modifying the polarisation state of the flux going through it in relation to the wavelength, the polarisation of both multiplexed fluxes ($\lambda_1$, $\lambda_3$, ..., $\lambda_{2p+1}$) and ($\lambda_2$, $\lambda_4$, ..., $\lambda_{2p}$) being interchanged between said components so that the polarisation beam splitter (9) orients said multiplexed fluxes towards the output gate of the device, and in that the optical device (1) comprises a fiber (16) forming a second input gate of the optical device (1) for the second multiplexed flux ($\lambda_2$, $\lambda_4$, ..., $\lambda_{2p}$)and whereof the end is located at the focus of a collimation lens (17) which sends said second flux to the separator (9).

3. An optical device according to claim 1 or claim 2, wherein in that said birefringent axes of the birefringent medium are oriented at 45° with respect to the axes of the polarisation beam splitter.

4. An optical device according to claim 1 or claim 2, wherein in that the birefringent medium (15) is a birefringent crystal.

5. An optical device according to claim 1 or claim 2, wherein in that the birefringent medium (15) is a birefringent optical fiber.

6. An optical device according to claim 1 or claim 2, wherein in that the polarization beam splitter (9) is a polarization beam separator cube.

7. An optical device according to claim 6, wherein in that the transfer means (14) are flat mirrors placed at 90°.

8. An optical switch wherein in that it contains a device for wavelength interleaving or dissociation according to claim 1, wherein that it contains a tuneable birefringent system (19) and control means (20) receiving an electrical signal (21).

9. An optical device according to claim 3, wherein in that the polarization beam splitter (9) is a polarization beam separator cube.

10. An optical device according to claim 9, wherein in that the transfer means (14) are flat mirrors placed at 90°.

11. An optical device according to claim 4, wherein in that the polarization beam splitter (9) is a polarization beam separator cube.

12. An optical device according to claim 11, wherein in that the transfer means (14) are flat mirrors placed at 90°.

13. An optical switch wherein in that it contains a device for wavelength interleaving or dissociation according to claim 2, wherein in that it contains a tuneable birefringent system (19) and control means (20) receiving an electrical signal (21).

* * * * *